United States Patent
Bleau et al.

(10) Patent No.: US 11,021,014 B2
(45) Date of Patent: Jun. 1, 2021

(54) WHEELCHAIR FRAME (71) Applicant: MOTION COMPOSITES INC, Saint-Roch-de-l'Achigan (CA)

(72) Inventors: Alexandre Bleau, Lachenaie (CA); Michael Archambault, Saint-Roch-de-l'Achigan (CA); Pierre-Andre Couture, Laval (CA); Alec Stephani, Saint-Lambert (CA); Maxime Lamarre, Terrebonne (CA); David Gingras, L'Assomption (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 236 days.

(21) Appl. No.: 16/081,459

(22) PCT Filed: Mar. 1, 2017

(86) PCT No.: PCT/CA2017/050276
§ 371 (c)(1),
(2) Date: Aug. 31, 2018

(87) PCT Pub. No.: WO2017/147705
PCT Pub. Date: Sep. 8, 2017

(65) Prior Publication Data
US 2019/0092093 A1 Mar. 28, 2019

Related U.S. Application Data

(60) Provisional application No. 62/310,036, filed on Mar. 18, 2016, provisional application No. 62/301,939, filed on Mar. 1, 2016.

(51) Int. Cl.
*A61G 5/10* (2006.01)
*A61G 5/02* (2006.01)
(Continued)

(52) U.S. Cl.
CPC ............ *B60B 33/0002* (2013.01); *A61G 5/10* (2013.01); *A61G 5/1056* (2013.01);
(Continued)

(58) Field of Classification Search
CPC ........... A61G 5/10; A61G 5/1043; A61G 5/02
See application file for complete search history.

(56) References Cited

U.S. PATENT DOCUMENTS

5,366,036 A * 11/1994 Perry .................... B60L 50/66
180/65.1
5,727,802 A 3/1998 Garven, Jr. et al.
(Continued)

*Primary Examiner* — Tony H Winner
*Assistant Examiner* — Michael R Stabley
(74) *Attorney, Agent, or Firm* — Norton Rose Fulbright Canada LLP (57) ABSTRACT

A tube assembly for a wheelchair frame comprises a tubular member having at least a first portion and a second portion angled relative to the first portion, the first portion configured to be in a seating zone of the wheelchair frame. The second portion is configured to be in a bottom front zone of the wheelchair frame, the tubular member defining a surface concavity in its peripheral surface delimited by a peripheral step, the surface concavity located at a junction between the first portion and the second portion of the tubular member. An interface member has a peripheral contour shaped and sized for the interface member to be received in the surface concavity and contoured at least partially by the peripheral step.

21 Claims, 7 Drawing Sheets

(51) Int. Cl.
*A61G 5/12* (2006.01)
*B60B 33/00* (2006.01)
*B60B 33/04* (2006.01)
*B60B 35/00* (2006.01)

(52) U.S. Cl.
CPC ........ *A61G 5/1097* (2016.11); *B60B 33/0026* (2013.01); *B60B 33/0065* (2013.01); *B60B 33/0068* (2013.01); *B60B 33/04* (2013.01); *A61G 5/02* (2013.01); *A61G 5/128* (2016.11); *B60B 33/0039* (2013.01); *B60B 33/0049* (2013.01); *B60B 33/0057* (2013.01); *B60B 35/009* (2013.01); *B60B 2200/22* (2013.01); *B60B 2200/26* (2013.01)

(56) References Cited

U.S. PATENT DOCUMENTS

| | | | |
|---|---|---|---|
| 6,623,022 B2 * | 9/2003 | Malassigne | A61G 5/08 |
| | | | 280/250.1 |
| 7,249,777 B2 * | 7/2007 | Schreiber | A61G 5/10 |
| | | | 180/907 |
| 7,520,518 B2 | 4/2009 | Peterson et al. | |
| 7,921,954 B2 * | 4/2011 | Johnson | A61G 5/045 |
| | | | 180/209 |
| 8,517,469 B1 * | 8/2013 | Hetzel | A61G 5/12 |
| | | | 297/284.4 |
| 2004/0173991 A1 | 9/2004 | Watterton | |

* cited by examiner

WHEELCHAIR FRAME

CROSS-REFERENCE TO RELATED APPLICATIONS

The present application claims priority on U.S. Patent Application Ser. No. 62/301,939, filed on Mar. 1, 2016, and on U.S. Patent Application Ser. No. 62/310,036, filed on Mar. 18, 2016, the content of both of which is inserted herein by reference.

TECHNICAL FIELD

The present application relates to wheelchairs and, more particularly, to various components of a wheelchair assembly.

BACKGROUND ART

Wheelchairs have evolved over the years to become increasingly ergonomic, lightweight, easy to maneuver and to use. However, there remains room for improvement to add additional adjustment possibilities to wheelchairs, and to render them even more convenient to use, notably in the maneuverability, stiffness, balance, but also for moving into or out of the wheelchair, and folding or unfolding the wheelchair for storage.

For example, the parts of the frame of the wheelchair adjacent to the user's legs, at a front end of the wheelchair, may also be exposed to impacts due to their protruding nature. Hence, they are rigid, which may make them uncomfortable to the use upon impact. Moreover, these parts may be the parts manipulated by a user, whether seated in a wheelchair or picking up the wheelchair, and may not be adapted for such manipulations.

SUMMARY

It is an aim of the present disclosure to provide a tube assembly for a wheelchair frame that provides additional functionalities.

Therefore, in accordance with the present disclosure, there is provided a tube assembly for a wheelchair frame comprising: a tubular member having at least a first portion and a second portion angled relative to the first portion, the first portion configured to be in a seating zone of the wheelchair frame, and the second portion configured to be in a bottom front zone of the wheelchair frame, the tubular member defining a surface concavity in its peripheral surface delimited by a peripheral step, the surface concavity located at a junction between the first portion and the second portion of the tubular member; and at least one interface member having a peripheral contour shaped and sized for the interface member to be received in the surface concavity and contoured at least partially by the peripheral step.

Further in accordance with the present disclosure, in an instance, the tubular member has a L-shape.

Still further in accordance with the present disclosure, in an instance, the tubular member is made of a monolithic molded composite material.

Still further in accordance with the present disclosure, in an instance, a bend angle between the first portion and the second portion of the tubular member is between 75 degrees and 105 degrees.

Still further in accordance with the present disclosure, in an instance, the surface concavity has a first concavity portion in the first portion of the tubular member, and a second concavity portion in the second portion of the tubular member.

Still further in accordance with the present disclosure, in an instance, the surface concavity defines a throat section between the first concavity portion and the second concavity portion.

Still further in accordance with the present disclosure, in an instance, the interface member includes a padding submember, the padding submember having a resilience greater than the tubular member.

Still further in accordance with the present disclosure, in an instance, the padding submember is located at least partially in the second concavity portion of the tubular member, and is oriented toward the seating zone.

Still further in accordance with the present disclosure, in an instance, the interface member includes a gripping submember, the gripping submember having a coefficient of friction greater than the tubular member.

Still further in accordance with the present disclosure, in an instance, the gripping submember is located at least partially in the first concavity portion of the tubular member and faces upwardly.

Still further in accordance with the present disclosure, in an instance, the interface member includes a cover submember, the padding submember being made of rigid wear material.

Still further in accordance with the present disclosure, in an instance, the cover submember is located at least partially in the second concavity portion of the tubular member, and faces forwardly in the wheelchair assembly.

Still further in accordance with the present disclosure, in an instance, the interface member includes a padding submember, a gripping submember and a cover submember, the padding member having a resilience greater than the gripping submember and than the cover submember, the gripping submember having a coefficient of friction greater than the padding submember and than the cover submember.

Still further in accordance with the present disclosure, in an instance, the padding submember is located at least partially on the second portion of the tubular member, and is oriented toward the seating zone.

Still further in accordance with the present disclosure, in an instance, the gripping submember is located at least partially on the first portion of the tubular member and faces upwardly.

Still further in accordance with the present disclosure, in an instance, the cover submember is located at least partially on the second portion of the tubular member, and faces forwardly in the wheelchair assembly.

Still further in accordance with the present disclosure, in an instance, the padding submember is made of rigid wear material.

Still further in accordance with the present disclosure, in an instance, the padding submember is comolded with the gripping submember.

Still further in accordance with the present disclosure, in an instance, the interface member defines a throat section joint configured to be located at the junction between the first portion and the second portion.

Still further in accordance with the present disclosure, in an instance, the peripheral contour of the interface member is entirely contoured by the peripheral step.

Still further in accordance with the present disclosure, in an instance, the tube assembly defines a continuous surface at a junction between the interface member and the tubular member.

Still further in accordance with the present disclosure, in an instance, there is provided a wheelchair frame comprising: a pair of the tube assembly as described above, and at least one frame member spacing the tube assemblies away from one another.

Still further in accordance with the present disclosure, in an instance, the tube assemblies of the pair are mirror images of one another.

BRIEF DESCRIPTION OF THE FIGURES

The present application relates to wheelchairs and, more particularly, to various components of a wheelchair assembly.

DETAILED DESCRIPTION

Figure 1:
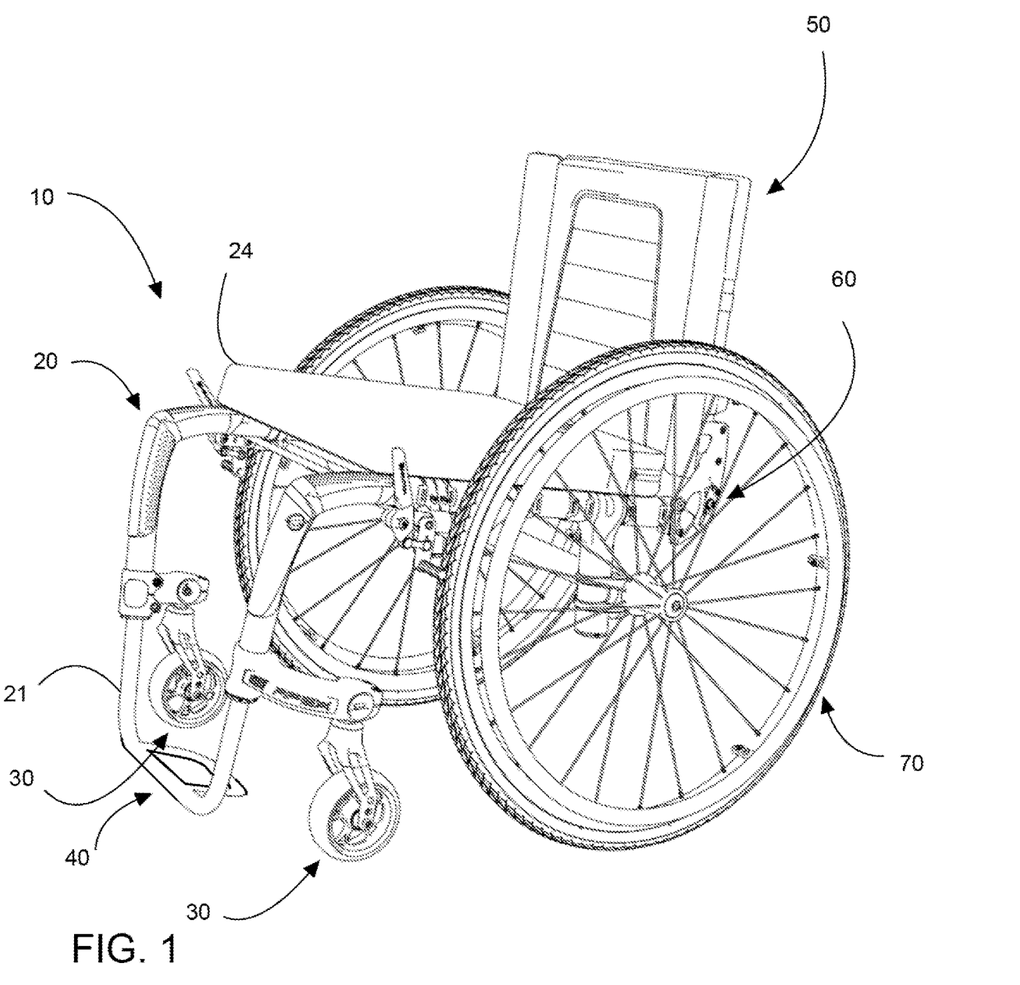
FIG. 1 is a perspective view of a wheelchair assembly in accordance with the present disclosure.
Figure 2:
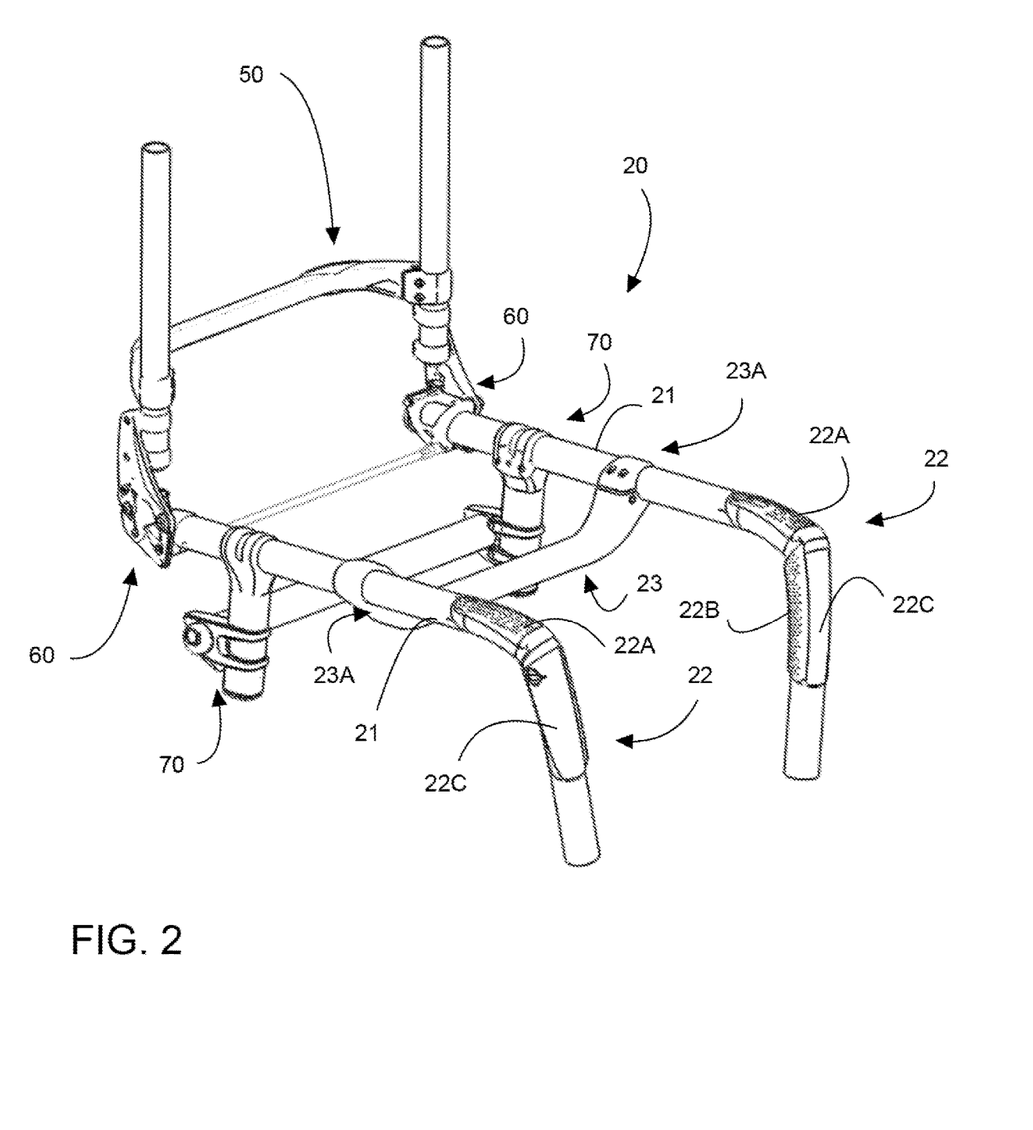
FIG. 2 is a perspective view of a wheelchair frame for the wheelchair assembly of FIG. 1.

Referring to the drawings and more particularly to FIGS. 1 and 2, there is illustrated a wheelchair assembly at 10, also simply referred to as wheelchair. The wheelchair assembly 10 is of the type having a plurality of other components, including a seat frame 20, a pair of front wheel units 30, a footrest 40, a backrest frame 50, bracket assemblies 60 and rear wheel units 70.

Figure 3:
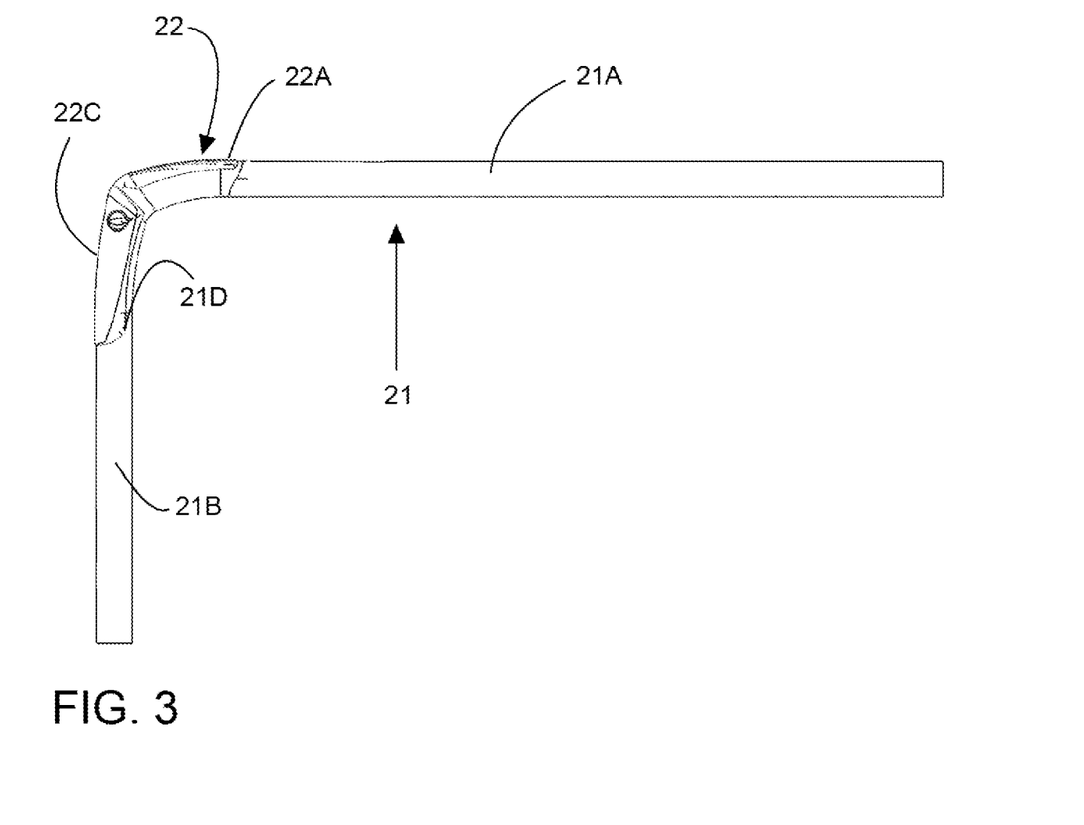
FIG. 3 is a side elevation view of a left-side tubular assembly of the wheelchair frame of FIG. 2.

The seat frame 20 is shown in greater detail in FIG. 2. The seat frame 20 forms the structure of the wheelchair assembly 20. The seat frame 20 has a pair of tube assemblies 21, a right-side tube assembly and a left-side tube assembly, for instance mirror images of one another. The tube assemblies 21 are shown isolated in FIGS. 3-7. In particular, FIG. 3 is a side elevation view illustrating the L-shape of the tube assemblies 21. The L-shape is one possible embodiment of the tube assemblies 21, and other shapes include a generally polygonal shape, a U-shape, etc. Although the expression "L-shape" is used, the tube assemblies 21 may appear to be a L rotated by 90 degrees clockwise or counterclockwise, depending on the point of view of the observer of the wheelchair 10 of FIG. 1. Moreover, although a right-angle bend is shown in FIG. 1, other angles may be used as observed in FIG. 7.

Figure 7:
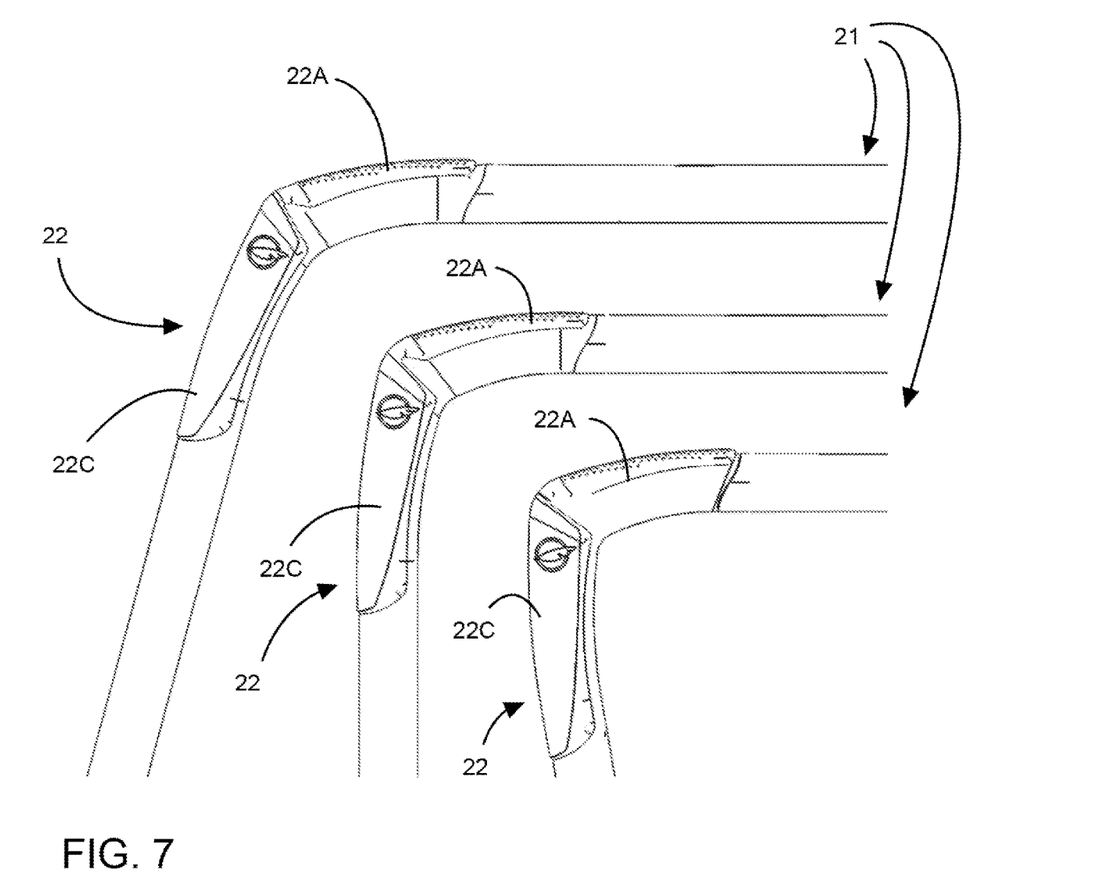
FIG. 7 is schematic view showing different bend angles of the tube of the tubular assembly, for a same interface member.

Referring to FIG. 2, the tube assemblies 21 may include a tubular member made in any appropriate material, such as carbon fiber, composites, metals (e.g., aluminum, titanium, steel, etc), and combinations thereof. According to an embodiment, the tubular member is a monolithic tube. The tubular member may have a first portion 21A and a second portion 21B. The first portion 21A is generally horizontal when the wheelchair 10 is on its wheels, as in FIG. 1. The expression "generally horizontal" is well depicted in FIG. 1, in that the first portion 21A may or may not be substantially parallel to the ground. It is observed that the first portion 21A is in the seating zone of the wheelchair 10, and may even support a seat of the wheelchair 10, as described hereinafter. The first portion 21A may also support the bracket assemblies 60 and the rear wheel units 70. The second portion 21B is generally vertical or generally upright when the wheelchair 10 is on its wheels, as in FIG. 1. The expression "generally vertical" is also well depicted in FIG. 1, in that the second portion 21B may or may not be substantially perpendicular to the ground. The second portion 21B is in the bottom front zone of the wheelchair 10, and may even support the front wheel units 30 and the footrest 40, as described hereinafter.

Figure 6:
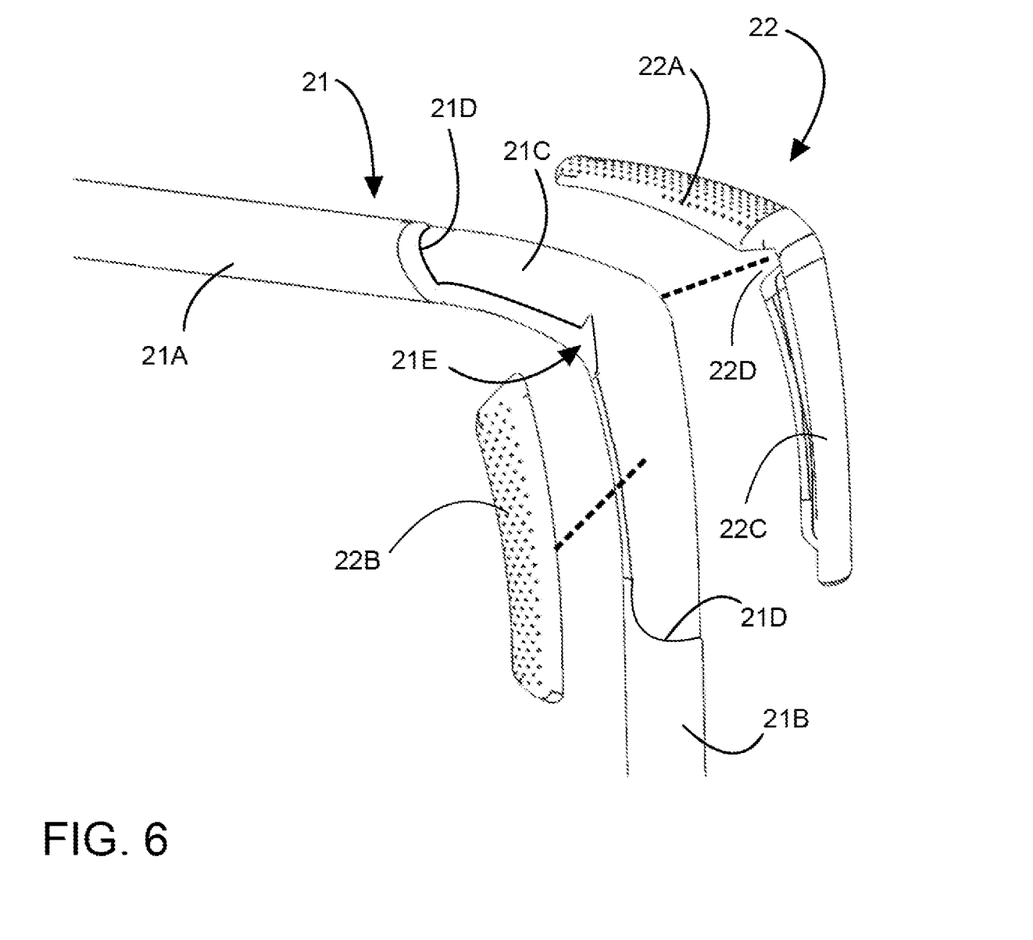
FIG. 6 is an assembly view of the interface member of FIG. 4, relative to a surface concavity of a tube of the tubular assembly.

Referring to FIG. 6, a surface concavity 21C may be defined in the tubular member. The surface concavity 21C is a depression (a.k.a., recess, groove, etc) delimited by peripheral step 21D. The surface concavity 21C may be machined or molded into the tubular member. In the illustrated embodiment, the surface concavity 21C is located at a junction between the first portion 21A and the second portion 21B. As shown in FIG. 6, the peripheral step 21D may have a generally uniform height all around the periphery of the surface concavity 21C. However, other arrangements are possible, for instance by having some ends of the surface concavity transition to a remainder the peripheral surface of the tubular member without a step. For example, a bottom end of the surface concavity 21C may have such a transition. The surface concavity 21C may have a first concavity portion that is in the first portion 21A, and a second concavity portion that is in the second portion 21B. Therefore, the first concavity portion faces upwardly, as it is in a part of the first portion 21A that is oriented upwardly when the wheelchair assembly 10 is on the ground as in FIG. 1. The second concavity portion faces forwardly, inwardly and outwardly, as it is in a part of the second portion 21B that faces forwardly when the wheelchair assembly 10 is on the ground as in FIG. 1. Moreover, the second concavity portion of the surface concavity 21C may have an inwardly facing portion, i.e., a portion facing toward the seating zone or toward the other tubular assembly 21.

Figure 4:
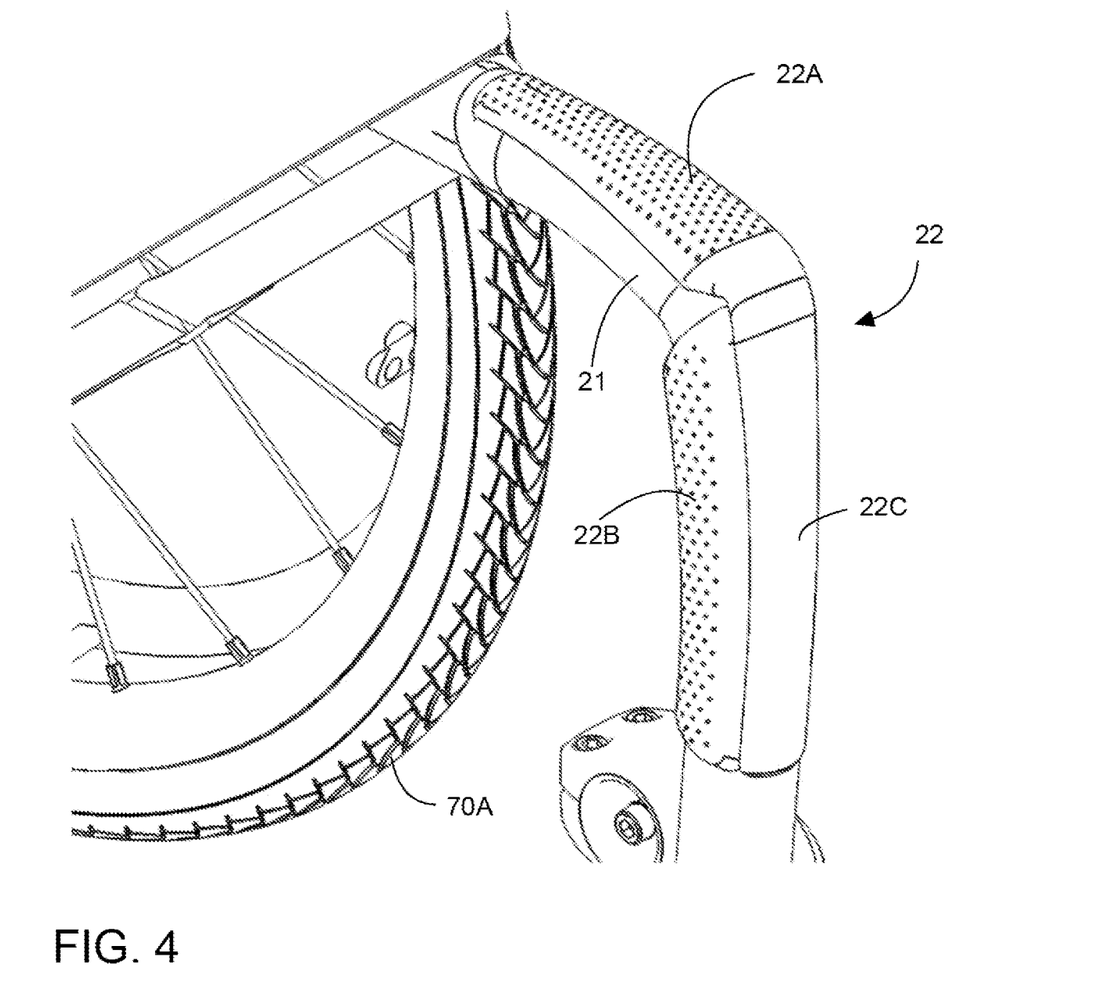
FIG. 4 is an enlarged perspective view of the left-side tubular assembly, showing an interface member.

Still referring to FIG. 6, the peripheral step 21D of the surface concavity 21C may define a throat section 21E. The throat section 21E may separate the first concavity portion from the second concavity portion. The surface concavity 21C may have its greatest width below the throat section 21E. In this manner, the surface concavity 21C covers a substantial portion of the lateral faces of the second portion 21B. Referring to FIGS. 3 and 4, the surface concavity 21C is shaped to receive the interface member 22 therein. According to an embodiment, the interface member 22 has a peripheral contour shaped and sized for the interface member 22 to be received in the surface concavity 21C and contoured partially or completely by the peripheral step 21D. According to a further embodiment, the peripheral contour of the interface member 22 emulates the shape of the surface concavity 21C such that the interface member 22 is entirely received in the surface concavity 21C. The peripheral edge of the interface member 22 may be in contact or flush with the peripheral step 21D, such that a junction between the peripheral surface of the tubular member is flush and continuous with that of the interface member 22 (i.e., no substantial rough edge). Stated differently, the tube assembly 21 defines a continuous surface 22 at a junction between the interface member 22 and the tubular member.

Referring to FIGS. 3 and 4, the interface member 22 may be made of one or more protective materials. In contrast to the tubular members who have a structural function, the interface member 22 is non-structural, in that it does not support the weight of the user. The interface member 22 may have a gripping submember 22A in the first portion 21A of the tubular member, upon which a user's hands may rest. The gripping submember 22A may also be grasped when the flipped-down wheelchair assembly 10 is being stowed, and therefore consists of a material with suitable adherence. For example, the gripping submember 22A may be made with a thermoplastic elastomer (TPE). A suitable hardness for the gripping submember 22A would be a shore of 60 C+/−5 among other possibilities. The gripping submember 22A may have a greater coefficient of friction than the other components of the interface member 22 and than the tubular member.

A padding submember 22B may be oriented inwardly, in the wider portion of the second portion 21B of the tubular member, to offer padding against leg contact. Typically, the padding submember 22B is made of a padding material, such as foams (polyurethane, EPS, EPP, etc) or resilient materials (e.g., gel). According to an embodiment, the padding submember 22B made out of urethane foam with a shore of 40 C+/−5. The padding submember 22B may have a greater resilience (greater modulus of elasticity, greater elastomeric properties) than the other components of the interface member 22 and than the tubular member. Also, the padding submember 22B may have a cover, skin or coating selected to have a low coefficient of friction to reduce friction with clothes. A textured pattern may also be present for this purpose.

A cover submember 22C covers a front and an outward side portion of the tube assembly 21. The cover submember 22C may be made of polypropylene, nylon, or like low-abrasion rigid wear materials. The cover submember 22C is a protective material against impacts, protecting the tube assemblies 21 during manipulations or transfer of the flipped-down wheelchair assembly 10, or during normal use, as the tube assemblies 21 protrude and may be exposed to contacts. The cover submember 22C may have greater plastomeric impact resistance than the other components of the interface member 22 and than the tubular member. The cover submember 22C faces forwardly and laterally outwardly, as shown in FIG. 3 for example.

Figure 5:
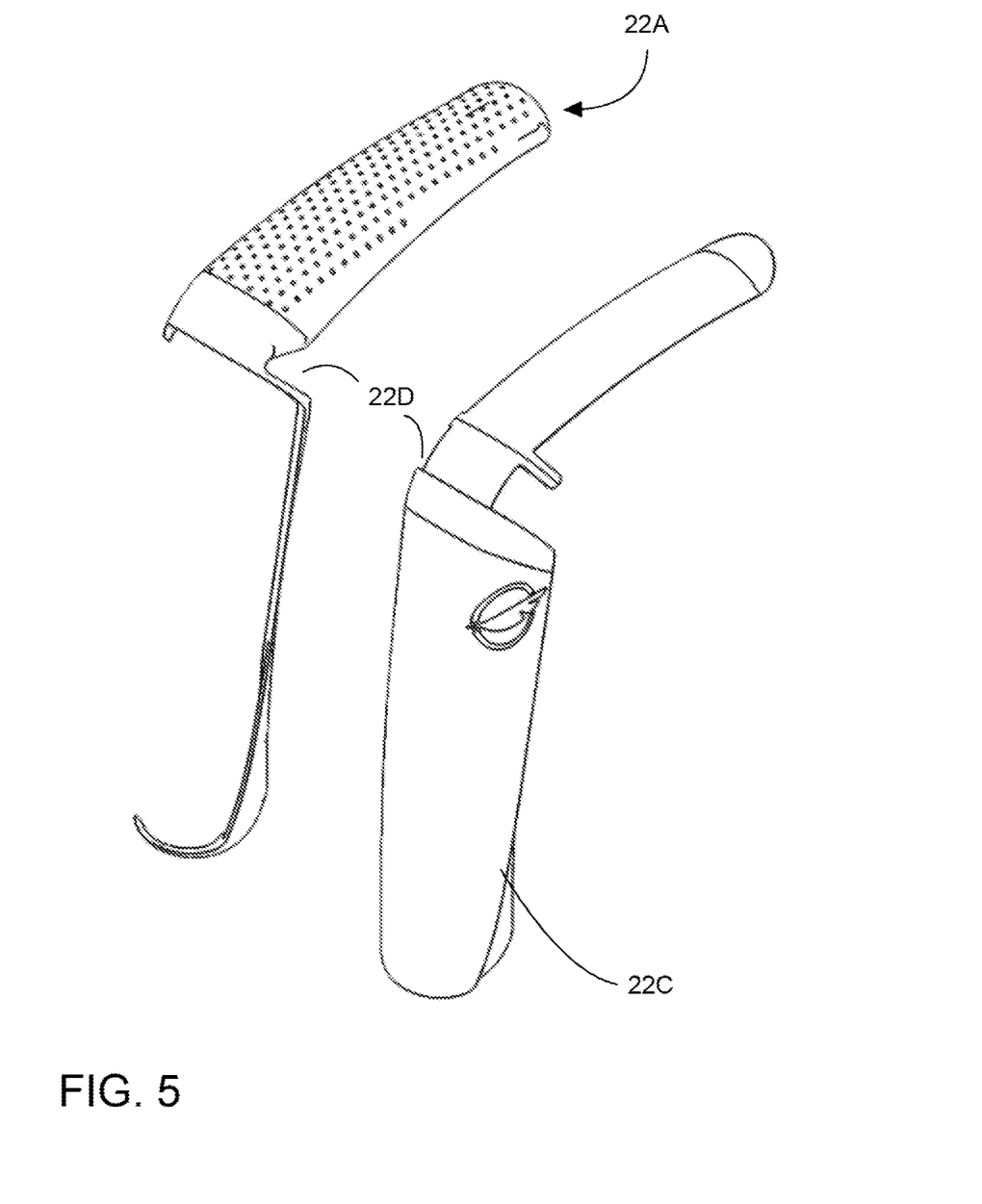
FIG. 5 is an assembly view of a gripping submember and of a cover submember of the interface member of FIG. 4.

Referring to FIG. 5, the gripping submember 22A and the cover submember 22C may be comolded to one another. The gripping submember 22A and the cover submember 22C are shown as they are shaped if separated from being comolded to one another. It is observed that the gripping submember 22A and the cover submember 22C both have a throat portion emulating the throat section 21E of the surface concavity 21C (FIG. 6). The reduced width, combined with the elastomeric properties of the portions 22A and 22C result in a joint 22D defined thereat. This allows the interface member 22 to deform from its native molded state to be installed on tubular members having different bends between 75 degrees and 105 degrees, inclusively, as shown in FIG. 7. Indeed, when molded, the native 3D shape of the gripping submember 22A and cover submember 22C is with a bend, as in FIG. 5. This native 3D geometry may match the 3D geometry of the surface concavity 21C, or may be elastically deformed to match it.

The integral interface member 22 may be connected to the tube 21 in any appropriate way. The embedding of the interface member 22 in the surface concavity 21C shields the interface member 22 from being peeling off, as the edges of the interface member 22 may be concealed by the peripheral step 21D. Any appropriate adhesive may be used to secure the interface member to the tube 21. For example, a liquid primer (e.g., 3M® primer) may be applied directly onto the undersurfaces of gripping submember 22A, of the padding submember 22B and of the cover submember 22C. A pre-cut double sided 3M® tape strip may then be used to bond the interface member 22 to the tube of the tubular assembly on 21.

Referring to FIG. 2, the seat frame 20 has a cross member 23. The cross member 23 is fixed at opposed ends to the tube assemblies 21. The cross member 23 is a rigid structural component, and therefore preserves the distance between the tube assemblies 21. Unlike other cross members enabling a lateral contraction of the seat frame 20, the cross member 23 does not provide contraction capability to the seat frame 20. The seat frame 20 is also rigidified by components of the backrest frame 50, bracket assemblies 60, and/or rear wheel units 70 as described hereinafter, which operate concurrently with the cross member 23 to limit movement between the tube assemblies 21. The tube assemblies 21 being spaced apart by the cross member 23 may hence support a seat 24 (FIG. 1). The seat 24 may be removably connected to the seat frame 20.

Although the interface member 22 is shown as having the gripping submember 22A, the padding submember 22B and the cover submember 22C, the interface member 22 may have any combination thereof, including having a single one of 22A, 22B and 22C, or any pair of them. In the instance when the interface member 22 has a single one of 22A, 22B, 22C, such a component is not a submember, but instead is a member. The interface member 22 is anchored to the tubular member in such a way that is not readily removable, unless substantial force is applied to the interface member 22. Hence, the relation between the interface member 22 and the tube assembly can be qualified as permanently fixed. Also, it is contemplated to use mechanical fasteners to fix the interface member 22 to the tube member, although not shown. In the illustrated embodiment, the interface member 22 does not form a sleeve around the tube member, as the properties provided by 22A, 22B and 22C may not be necessary in undersides of the tube member, for example.

The invention claimed is:

1. A tube assembly for a wheelchair frame comprising:
a tubular member having at least a first portion and a second portion angled relative to the first portion, the first portion configured to be in a seating zone of the wheelchair frame, and the second portion configured to be in a bottom front zone of the wheelchair frame, the tubular member defining a surface concavity in its peripheral surface delimited by a peripheral step, the surface concavity located at a junction between the first portion and the second portion of the tubular member; and
at least one interface member having a peripheral contour shaped and sized for the interface member to be received in the surface concavity and contoured at least partially by the peripheral step.

2. The tube assembly according to claim 1, wherein the tubular member has a L-shape.

3. The tube assembly according to claim 1, wherein the tubular member is made of a monolithic molded composite material.

4. The tube assembly according to claim 1, wherein a bend angle between the first portion and the second portion of the tubular member is between 75 degrees and 105 degrees.

5. The tube assembly according to claim 1, wherein the surface concavity has a first concavity portion in the first portion of the tubular member, and a second concavity portion in the second portion of the tubular member.

6. The tube assembly according to claim 5, wherein the surface concavity defines a throat section between the first concavity portion and the second concavity portion.

7. The tube assembly according to claim 5, wherein the interface member includes a padding submember, the padding submember having a resilience greater than the tubular member.

8. The tube assembly according to claim 7, wherein the padding submember is located at least partially in the second concavity portion of the tubular member, and is oriented toward the seating zone.

9. The tube assembly according to claim 5, wherein the interface member includes a gripping submember, the gripping submember having a coefficient of friction greater than the tubular member.

10. The tube assembly according to claim 9, wherein the gripping submember is located at least partially in the first concavity portion of the tubular member and faces upwardly.

11. The tube assembly according to claim 5, wherein the interface member includes a cover submember, the padding submember being made of rigid wear material.

12. The tube assembly according to claim 11, wherein the cover submember is located at least partially in the second concavity portion of the tubular member, and faces forwardly in the wheelchair assembly.

13. The tube assembly according to claim 1, wherein the interface member includes a padding submember, a gripping submember and a cover submember, the padding member having a resilience greater than the gripping submember and than the cover submember, the gripping submember having a coefficient of friction greater than the padding submember and than the cover submember.

14. The tube assembly according to claim 13, wherein the padding submember is located at least partially on the second portion of the tubular member, and is oriented toward the seating zone.

15. The tube assembly according to claim 13, wherein the gripping submember is located at least partially on the first portion of the tubular member and faces upwardly.

16. The tube assembly according to claim 13, wherein the cover submember is located at least partially on the second portion of the tubular member, and faces forwardly in the wheelchair assembly.

17. The tube assembly according to claim 13, wherein the padding submember is made of rigid wear material.

18. The tube assembly according to claim 17, wherein the padding submember is comolded with the gripping submember.

19. The tube assembly according to claim 1, wherein the interface member defines a throat section joint configured to be located at the junction between the first portion and the second portion.

20. The tube assembly according to claim 1, wherein the peripheral contour of the interface member is entirely contoured by the peripheral step.

21. The tube assembly according to claim 1, wherein the tube assembly defines a continuous surface at a junction between the interface member and the tubular member.

* * * * *